United States Patent [19]
Sutoh et al.

[11] Patent Number: 5,781,223
[45] Date of Patent: Jul. 14, 1998

[54] HEAD DEVICE FOR PRINTER

[75] Inventors: Akio Sutoh; Yukio Seto, both of Minami-ashigara, Japan

[73] Assignee: Fuji Photo Film Co., Ltd., Kanagawa, Japan

[21] Appl. No.: 609,901

[22] Filed: Feb. 29, 1996

[30] Foreign Application Priority Data

Mar. 2, 1995 [JP] Japan ................... 7-043082

[51] Int. Cl.⁶ .................................. B41J 2/45
[52] U.S. Cl. ................ 347/238; 347/256; 385/88; 385/89
[58] Field of Search ................ 347/238, 232, 347/241, 244, 256, 258, 224; 385/88, 89, 92, 138, 139; 358/52, 63, 76; 279/83; 403/228; 29/235, 237, 524; 350/96

[56] References Cited

U.S. PATENT DOCUMENTS

| | | | |
|---|---|---|---|
| 2,598,115 | 5/1952 | Dodge | 403/228 |
| 4,118,105 | 10/1978 | Voigt | 350/96.2 |
| 4,389,655 | 6/1983 | Baues | 347/241 |
| 4,797,691 | 1/1989 | Akiyoshi et al. | 347/232 |
| 4,958,966 | 9/1990 | Andrews | 279/83 |

FOREIGN PATENT DOCUMENTS

| | | | |
|---|---|---|---|
| A30025956 | 4/1981 | European Pat. Off. | H04N 1/036 |
| A20364934 | 4/1990 | European Pat. Off. | G06K 1/12 |
| A20419216 | 3/1991 | European Pat. Off. | H04B 10/18 |
| 2651898 | 9/1989 | France | G03B 1/60 |
| 63-46409 | 2/1988 | Japan | G02B 27/00 |
| 2-100043 | 4/1990 | Japan | G03C 1/00 |
| 2-150826 | 6/1990 | Japan | G03B 17/24 |
| 3-144533 | 6/1991 | Japan | 347/256 |
| 4-42148 | 2/1992 | Japan | G03C 1/76 |

OTHER PUBLICATIONS

Patent Abstracts of Japan; vol. 14, No. 504 (P-1127), Jan. 5, 1990, & JP A 02 210343 (Konica), Aug. 21, 1990, *Abstract*.

Patent Abstracts of Japan; vol. 11, No. 383 (P-646), Dec. 15, 1987, & JP A 62 150308 (Sumitomo Electric Ind Ltd), Jul. 4, 1987, *Abstract*.

*Primary Examiner*—N. Le
*Assistant Examiner*—Hai C. Pham
*Attorney, Agent, or Firm*—Sughrue, Mion, Zinn, Macpeak & Seas, PLLC

[57] ABSTRACT

A print head for use in a printer has a light source, a pair of lenses, and a pair of light guides. The light source has five light-emitting diodes for emitting light through respective optical fibers of the light guide to the lens. The optical fibers have the same curvature and length for uniformizing the amounts of light that are applied through the lens to a photosensitive medium.

7 Claims, 10 Drawing Sheets

HEAD DEVICE FOR PRINTER

BACKGROUND OF THE INVENTION

1. Field of the Invention

The present invention relates to a head device for use in printers for printing letters, symbols, etc. on an edge of a photosensitive medium.

2. Description of the Related Art

Head devices are widely used to record latent images on an edge of a photosensitive medium such as a photosensitive film by exposing it to various pieces of information including a manufacturer's name, a product name, frame numbers, and a DX bar code. Such head devices generally have a light source such as light-emitting diodes (LEDs) and optical fibers serving as light guides. A beam of light produced by the light source enters an entrance end of the optical fibers, and is emitted from an opposite exit end of the optical fibers and applied to a photosensitive medium for thereby forming a latent image on an edge thereof.

The optical fibers are usually in the form of glass fibers made of quartz glass or plastic fibers made of polymethyl methacrylate (PMMA), polycarbonate (PC), polystyrene (PS), or the like. At the exit end, the optical fibers are arranged in a matrix or zigzag pattern of dots for printing letters, symbols, etc. on the photosensitive medium.

To provide such a matrix or zigzag pattern of dots, it has been proposed to form each dot with a bundled structure of optical fibers of small diameter as disclosed in Japanese laid-open patent publications Nos. 4-42148and 2-100043, for example, and to form each dot with a single optical fiber as disclosed in Japanese laid-open patent publications Nos. 63-46409 and 2-150826, for example.

The bundled structure of optical fibers is disadvantageous in that gaps or clearances between the optical fibers reduce an effective area of the head device, resulting in a low optical coupling efficiency and a light intensity loss. In order to use the bundled structure as a light guide, it has to be of accurate dimensions. However, a large number of manufacturing steps and a precise and highly refined manufacturing process are required to produce a bundled structure of accurate dimensions, with the consequence that the resultant head device is considerably expensive.

In the case where each dot is formed by a single optical fiber, the curvature of an optical fiber corresponding to each dot tends to vary. Therefore, the optical fibers are apt to cause different light transmission losses (light intensity losses), with the result that a latent image formed on the exposed photosensitive medium will suffer density irregularities. The curvature of optical fibers may be reduced when they are elongated, but elongated optical fibers make the head device larger in size.

SUMMARY OF THE INVENTION

It is a major object of the present invention to provide a head device for printers which is capable of efficiently recording uniform latent images on a photosensitive medium and which is suitable for being constructed in a small size.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
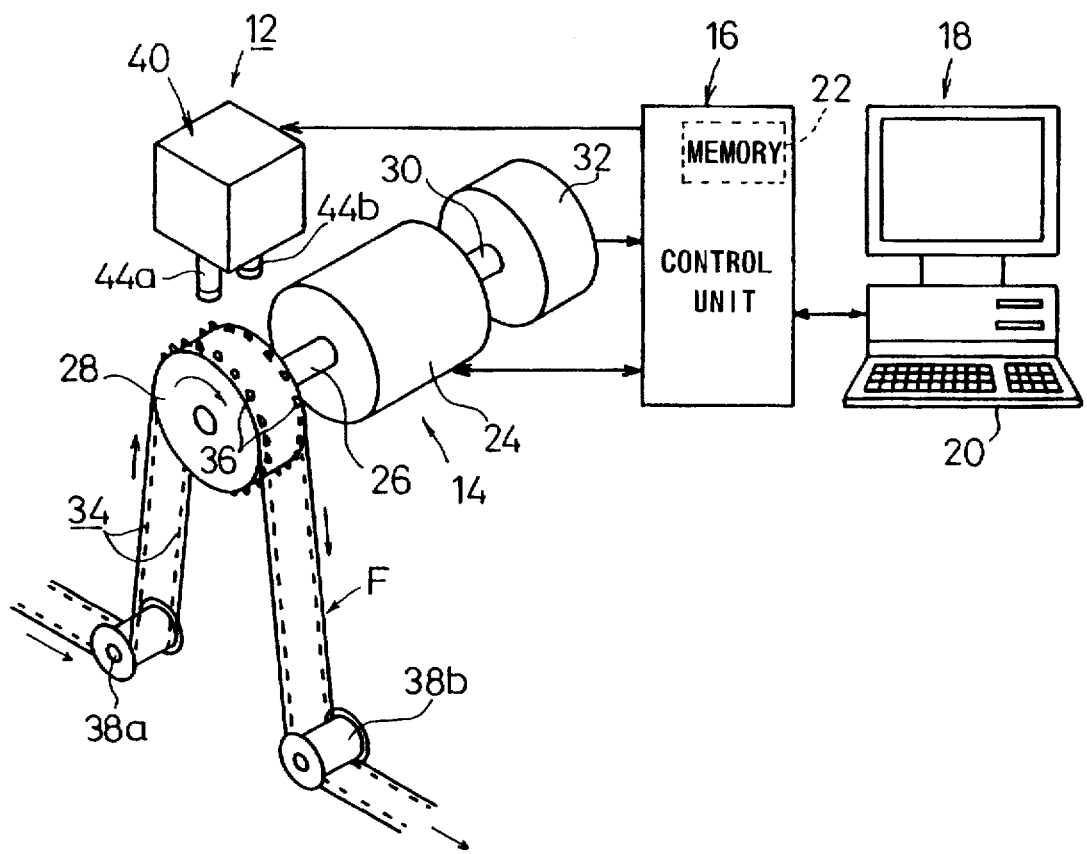
FIG. 1 is a schematic view, partly in perspective, of a side printing system which incorporates a head device according to a first embodiment of the present invention.

As shown in FIG. 1, a side printing system 10 comprises a head device 12 according to a first embodiment of the present invention, a film feeder 14 for feeding a photosensitive film F across the head device 12, a control unit 16 for controlling the head device 12 and the film feeder 14, and a computer 18 connected to the control unit 16.

When the operator of the side printing system 10 operates a keyboard 20 of the computer 18, various pieces of information representing letters, symbols, etc. which can be printed by exposure on the photosensitive films F and periods of time for which the photosensitive film F is to be exposed to those letters, symbols, etc. are stored in a memory 22 in the control unit 16. Depending on the desired photosensitive film F, some of the stored pieces of information are selected and held in the memory 22.

The film feeder 14 comprises a servomotor 24 having a rotatable shaft 26 coupled to a feed roller 28 and an opposite rotatable shaft 30 coupled to a rotary encoder 32. When the feed roller 28 starts and stops rotating to feed the photosensitive film F, the feed roller 28 is accurately controlled in speed and torque by the servomotor 24 to prevent the photosensitive film F from suffering backlash or backward movement.

The feed roller 28 feeds the photosensitive film F on its outer circumferential surface such that the emulsified surface thereof faces radially outwardly. The feed roller 28 has a sprocket structure including a pair of rows of teeth 36 for engaging in a pair of rows of perforations 34 defined in opposite longitudinal edges of the photosensitive film F. The film feeder 14 also includes a pair of spaced guide rollers 38a, 38b positioned below the feed roller 28 for guiding the photosensitive film F when it is fed from a film puncher (not shown) in the direction indicated by the arrows around the feed roller 28.

The rotary encoder 32 detects the angular velocity of the feed roller 28, and supplies information representing the detected angular velocity of the feed roller 28 to the control unit 16 at all times. Based on the supplied information from the rotary encoder 32, the control unit 16 controls exposure timing of the head device 12, i.e., controls the head device 12 to expose the photosensitive film F to desired optical information at correct times.

Figure 2:
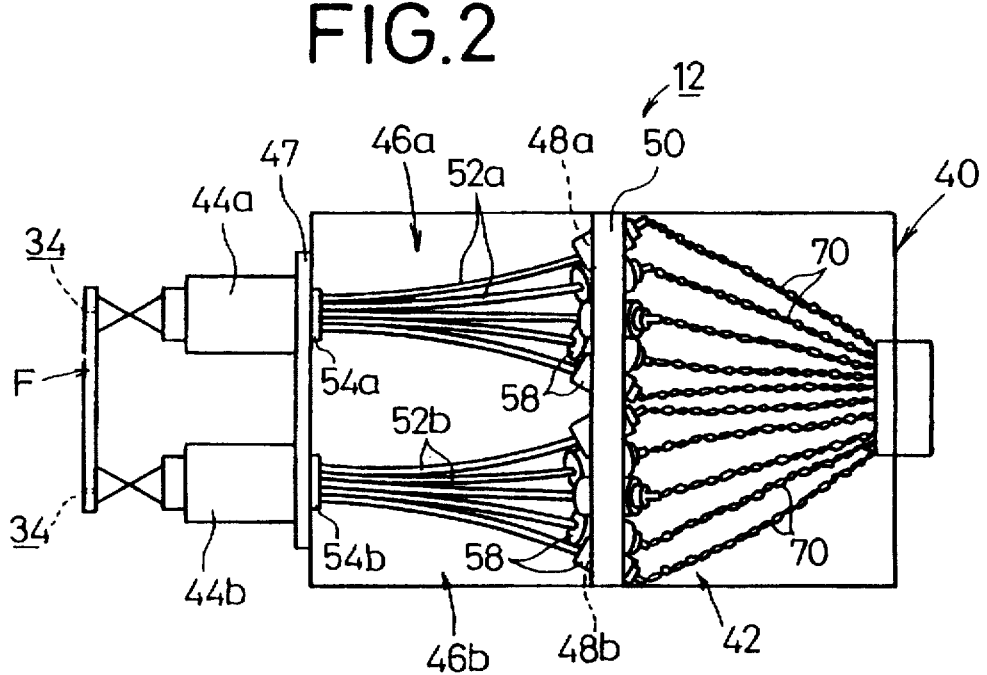
FIG. 2 is a view showing an internal structure of the head device.

As shown in FIG. 2, the head device 12 comprises a light source 42 disposed in a housing 40, two lenses (an optical system) 44a, 44b mounted on an outer surface of a side wall of the housing 40, and a pair of light guides 46a, 46b, disposed in the housing 40 for guiding light from the light source 42 to the lenses 44a, 44b, respectively. The lenses 44a, 44b are vertically directed toward the respective opposite, longitudinal edges of the photosensitive film F. The lenses 44a, 44b are supported on the side wall of the housing 40 by a lens mount 47.

The light source 42 comprises a set of five LEDs 48a and a set of five LEDs 48b which are angularly positioned relatively to the directions of three axes of an orthogonal coordinate system i. e., angularly positionally adjusted three-dimensionally, by and mounted on a mount plate 50 in the housing 40. The LEDs 48a are connected, to respective entrance ends of five optical fibers (plastic fibers) 52a of the light guide 46a, which have opposite exit ends positioned in confronting relationship to the lens 44a by a fiber holder 54a. The five optical fibers 52a have the same curvature and length.

The LEDs 48b are connected to respective entrance ends of five optical fibers (plastic fibers) 52b of the light guide 46b, which have opposite exit ends positioned in confronting relationship to the lens 44b by a fiber holder 54b. The five optical fibershave the same curvature and length.

The exit ends of the optical fibers 52a, have respective axes directed perpendicularly to the surfaces of the lenses 44a, through the fiber holders 54a, 54b. Each of the fiber holders 54a, 54b comprises a light-shielded plastic plate containing carbon black or a metal plate coated with a light-absorbing paint.

The LEDs 48a, 48b and the respective optical fibers 52a, 52b are coupled to each other by identical structures. The coupled structure of one LED 48a and one optical fiber 52a, for example, will be described below with reference to FIG. 3.

The entrance end of the optical fiber 52a is connected to the LED 48a by an LED holder 58 and has its face lying perpendicularly to a beam of light emitted from the LED 48a. The LED holder 58 is made of a light-shielded plastic material containing carbon black or a metal material coated with a light-absorbing paint.

The LED holder 58 is of a substantially cylindrical shape, and has a stepped hole 60 defined therein which includes a smaller-diameter portion and a larger-diameter portion having an internally threaded hole 62. The LED 48a is disposed in the larger-diameter portion of the stepped hole 60, and the optical fiber 52a extends into the smaller-diameter portion of the stepped hole 60 and is held therein by a retainer 64. A hollow cylindrical retainer screw 66 is threaded in the internally threaded hole 62 against the LED 48a, and securely fastened in the LED holder 58 by a nut 68 tightened on the retainer screw 66. Leads 70 extending from the LED 48a pass through the retainer screw 66 and are connected to the control unit 16. The LED holder 58 is resiliently mounted on the mount plate 50 by a rubber bushing 72 fitted over the LED holder 58.

Figure 4:
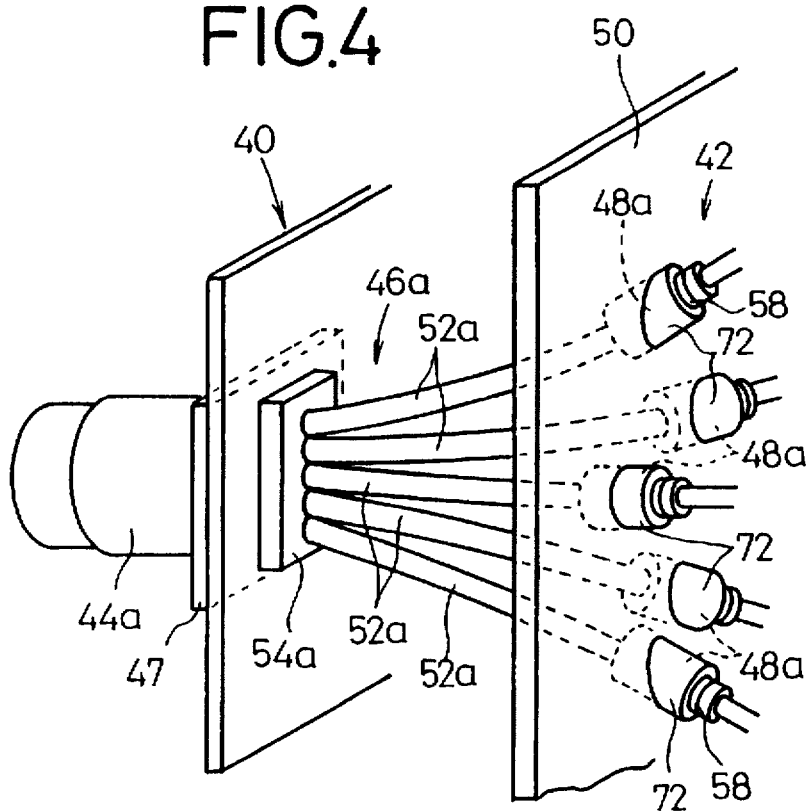
FIG. 4 is a fragmentary perspective view of the internal structure of the head device.

As shown in FIG. 4, the five LED holders 58 which hold the respective LEDs 48a are disposed in a zigzag pattern i bon the mount plate 50 such that the five optical fibers 52a coupled to the respective LEDs 48a have the same curvature and length and their exit ends are arrayed and have respective axes directed perpendicularly to the surface of the lens 44a.

The other five LED holders 58 which hold the respective LEDsb are disposed in a zigzag pattern on the i mount plate 50 (see FIG. 2) such that the five optical fibers 52b coupled to the respective LEDs 48b have the same curvature and length and their exit ends are arrayed and have respective axes directed perpendicularly to the surface lens 44b.

Operation of the head device 12 according to the first embodiment of the present invention will be described below in relation to the side printing system 10.

When the servomotor 24 of the film feeder 14 is energized by the control unit 16, the rotatable shafts 26, 30 of the servomotor 24 are rotated about their own axes. The feed roller 28 fixed to the rotatable shaft 26 is rotated in the direction indicated by the arrows for thereby positively feeding the photographic film F also in the direction indicated by the arrows through engagement of the teeth 34 in the perforations 34 in the photographic film F. The photographic film F may comprise an elongate color or black-and-white film for producing a roll film according to the J135 standard.

The rotary encoder 32 coupled to the other rotatable shaft 30 of the servomotor 24 supplies angular velocity information to the control unit 16 at all times. Based on pieces of information successively read from the memory 22, the control unit 16 outputs drive signals to energize the LEDs 48a, 48b of the head device 12.

For example, when one of the LEDs 48a is lenergized, it emits and applies a beam of light to the optical fiber 52a coupled thereto, and the beam of light is emitted from the exit end of the optical fiber 52a toward the lens, exposing a desired position on the photographic film F thereby to form a latent image thereon.

In the first embodiment, the optical fibers 52a, 52b for guiding light from the LEDs 48a, 48b to the lenses 44a, 44b have the same curvature and length. Therefore, light intensity losses caused by the five optical fibers 52a and the five optical fibersare the same as each other, so that the photosensitive film F are exposed to uniform amounts of light by the optical fibers 52a, 52b through the lenses 44a, 44b. Consequently, latent images formed on the photosensitive film F are uniform and free of density irregularities.

The LEDs 48a, 48b are angularly positioned i relatively to the directions of three axes of an orthogonal coordinate system, i.e., angularly positionally adjusted three-dimensionally, by and mounted on the mount plate 50. This is effective in minimizing the curvature of the optical fibers 52a, 52b for guiding light from the LEDs 48a, 48b to the lenses 44a, 44b to such an lextent that any losses of the intensity of transmitted light will be negligible, and also in causing the optical fibers 52a, 52b to undergo only a single instance of curvature. Accordingly, it is possible to reduce light intensity losses caused by the optical fibers 52a, 52b as much as possible for allowing the photographic film F to be exposed highly efficiently to the light transmitted through the optical fibers 52a, 52b. With this arrangement, the side printing system 10 can easily print a low-sensitivity photographic film F while the photographic film F is being fed at high speed, and hence can perform printing operation highly efficiently.

Because the LEDs 48a, 48b are positioned on the mount plate 50 in the three-axis directions, the head device 12 is rendered compact. The cost of the head device 12 is relatively low because the optical fibers 52a, 52b comprise plastic fibers.

Figure 5:
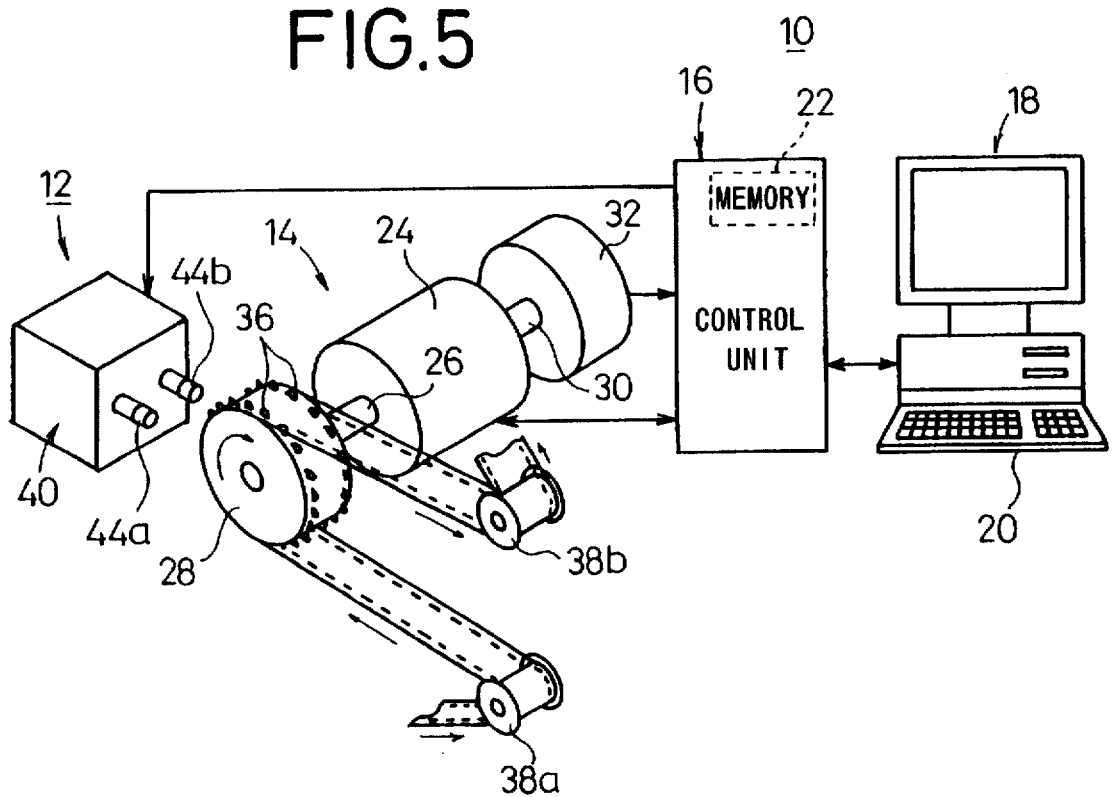
FIG. 5 is a schematic view, partly in perspective, of a side printing system with the head device being directed horizontally.

In the above embodiment, the head film 12 is positioned above and directed vertically downwardly toward the photosensitive film F. However, as shown in FIG. 5, the feed rollers 28 may be positioned between and laterally of the guide rollers 38a, 38b, and the head idevice 12 may be positioned laterally of and directed horizontally toward the photosensitive film F.

Figure 3:
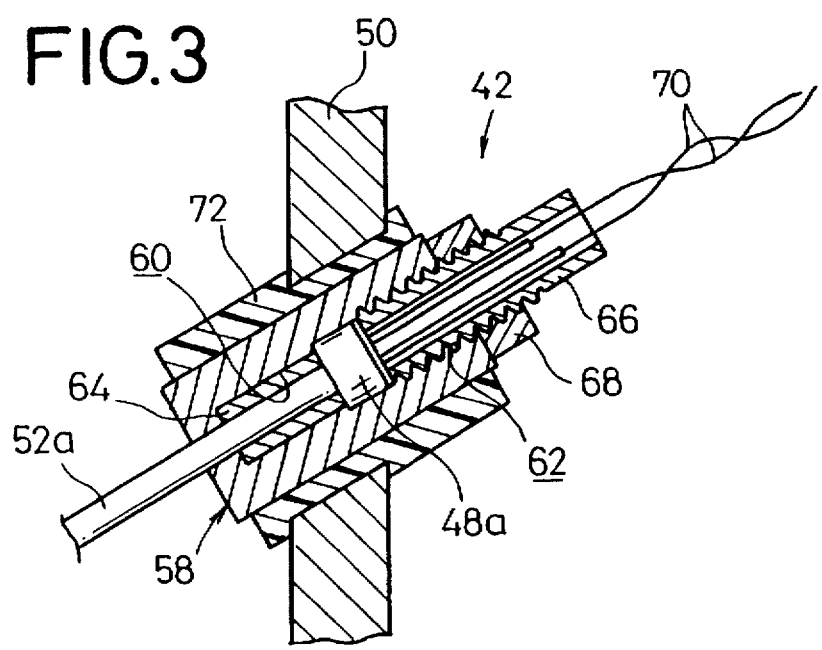
FIG. 3 is a cross-sectional view showing a coupled structure of an optical fiber and an LED in the head device.
Figure 6:
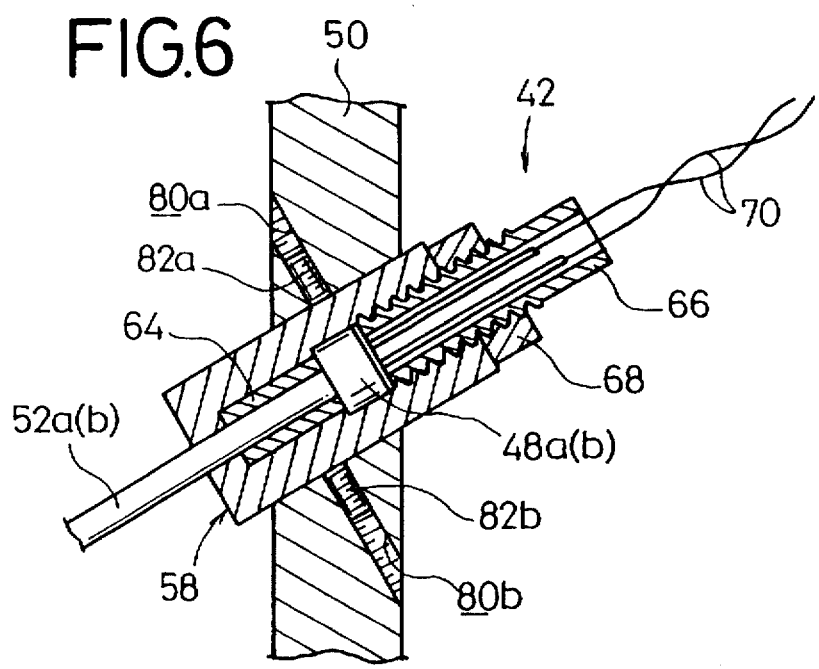
FIG. 6 is a cross-sectional view showing another coupled structure of an optical fiber and an LED.

In FIG. 3, the LED holder 58 is mounted on the mount plate 50 by the bushing 72. However, as shown in FIG. 6, the LED holder 58 is directly mounted on the mount plate 50 and securely held in position by a pair of setscrews 82a, 82b which are threaded in respective internally threaded holes 80a, 80b defined in the mount plate 50 and have respective tip ends held against the LED holder 58.

Figure 7:
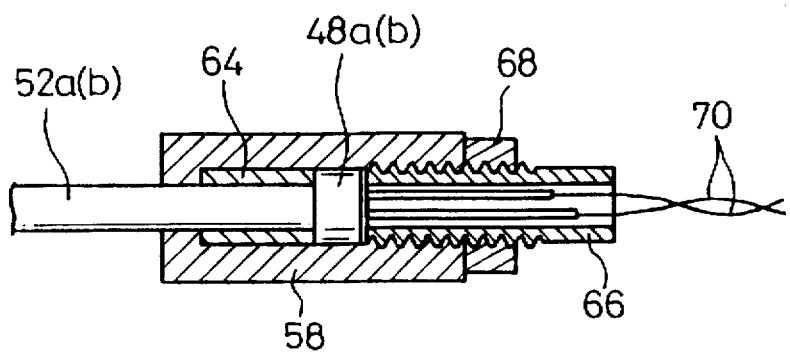
FIG. 7 is a cross-sectional view showing still another coupled structure of an optical fiber and an LED.

If the optical fibers 52a, 52b are sufficiently thick as shown in FIG. 7, then the entrance ends of the optical fibers 52a, 52b may be coupled to the respective LEDs 48a, 48b only by the LED holders 58 without the mount plate 50.

Figure 8:
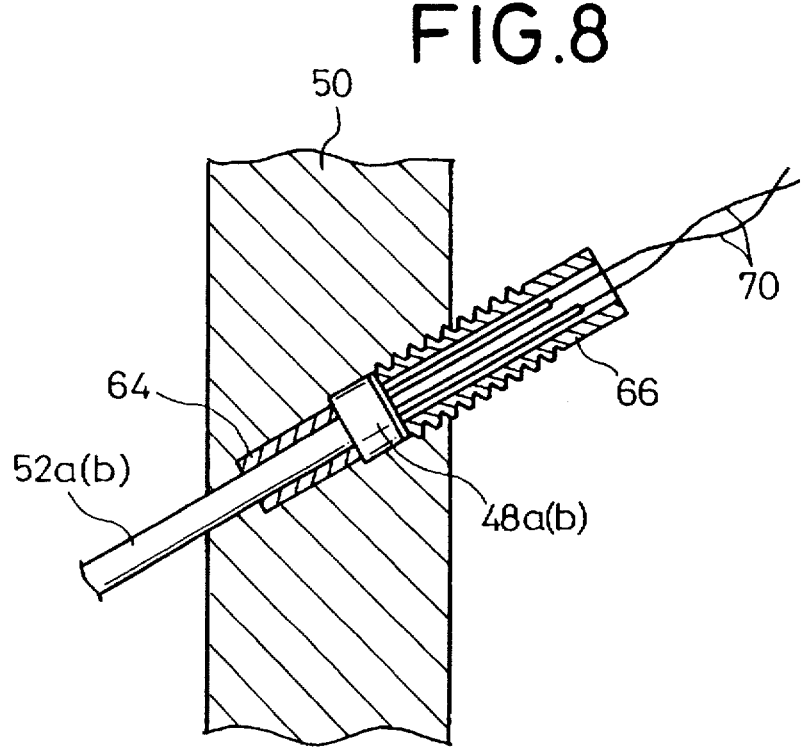
FIG. 8 is a cross-sectional view showing yet still another coupled structure of an optical fiber and an LED.

If the number of LEDs 48a, 48b used is small, the entrance ends of the optical fibers 52a, 52b and the respective LEDs 48a, 48b may be directly supported in the mount plate 50 without the LED holders 58, as shown in FIG. 8.

Figure 9:
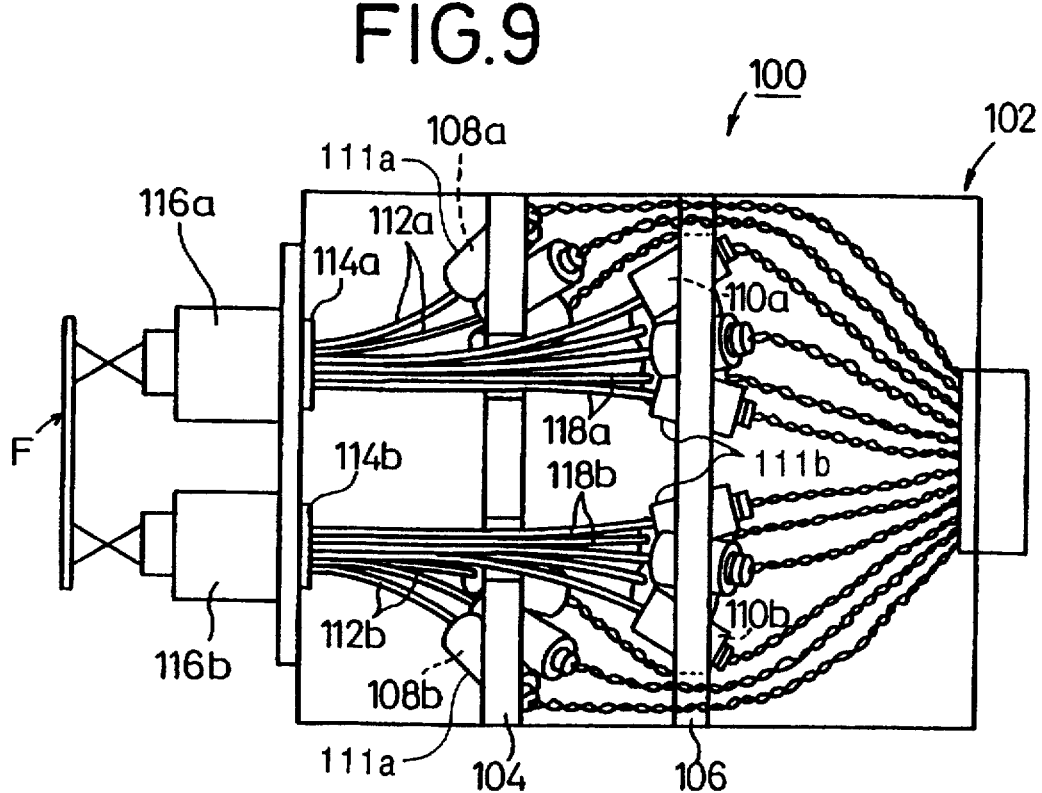
FIG. 9 is a view showing an internal structure of a head device according to a second embodiment of the present invention.

A head device 100 according to a second embodiment of the present invention will be described below with reference to FIG. 9.

The head device 100 has a housing 102 which accommodates a first mount plate 104 and a second mount plate 106 spaced a certain distance from each other. Five LEDs 108a and five LED 108b are angularly positioned relatively to the directions of three axes of an orthogonal coordinate system, i.e., angularly positionally adjusted three-dimensionally, by and mounted on the first mount plate 104 by LED holders 111a, and five LEDs 110a and five LEDs 110b are also angularly positioned relatively to the directions of three axes of an orthogonal coordinate system, i.e., angularly positionally adjusted three-dimensionally, by and mounted on the second mount plate 106 by LED holders 111b.

The LEDs 108a, 108b and the LEDs 110a, 110b emit lights in respective different wavelengths. For example, the LEDs 108a, 108b emit green light, and the LEDs 110a, 110b emit red light with greater power than the green light.

Optical fibers 112a have respective entrance ends coupled respectively to the five LEDs 108a and respective exit ends which are arrayed and have respective axes directed perpendicularly to the surface of a lens 116a through a fiber holder 114a. Optical fibers 112b have respective entrance ends coupled respectively to the five LEDs 108b and respective exit ends which are arrayed and have respective axes directed perpendicularly to the surface of a lens 116b through a fiber holder 114b.

Similarly, optical fibers 118a, 118b have respective entrance ends coupled respectively to the LEDs 110a, 110b and have respective exit ends which are arrayed and held by the fiber holders 114a, 114b.

The optical fibers 112a, 112b have the same curvature and length and the optical fibers 118a, 118b have the same curvature and length to uniformize the powers of lights emitted from the LEDs 108a, 108b, 110a, 110b.

Figure 10:
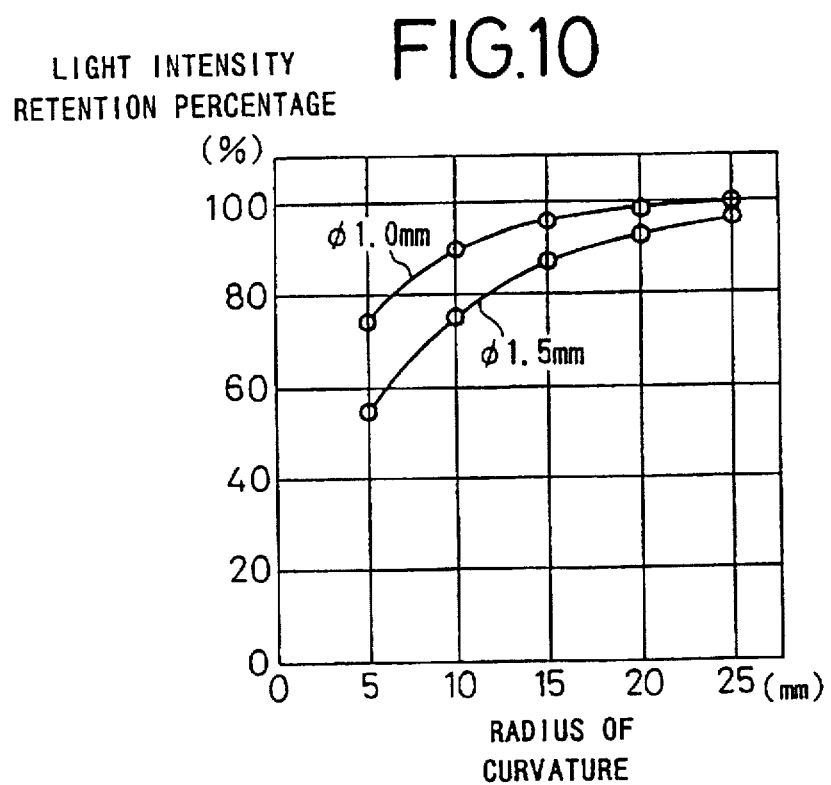
FIG. 10 is a diagram showing the relationship between the radius of curvature and the light intensity retention percentage when optical fibers are bent as they are left to stand.

If the LEDs 108a, 108b are identical to each other, then it is possible to vary the length and curvature of the optical fibers 112a, 112b for expressing a two-gradation representation within one color. Specifically, it is possible to vary the amount of light emitted from the optical fibers 112a, 112b if they have different fiber thicknesses and curvatures based on the nature of optical fibers which causes different light intensity losses when they are bent, as they are left to stand as shown in FIG. 10.

With the optical fibers being thus constructed to have different fiber thicknesses and curvatures, the intensity of light emitted by the LEDs, which have heretofore been electrically controlled, can easily be controlled by the optical fibers. For example, if the optical fibers 112a and the optical fibers 118a have different lengths and curvatures, then the amounts of green and red lights emitted from the LEDs 108a, 108b in different wavelengths and applied to the photosensitive film F can be uniformized. The amounts of lights applied to the photosensitive film F can also be uniformized by varying the powers of the LEDs 108a, 108b and also varying the length and curvature of the optical fibers 112a, 112b.

With the head devices according to the present invention, as described above, since the optical fibers for guiding light emitted from the LEDs to the optical system or lenses are of the same curvature and length, losses of the light intensity caused by the optical fibers are uniformized, thereby uniformizing the amounts of lights applied from the optical fibers to the photosensitive medium. Consequently, it is possible to form uniform-density latent images efficiently on the photosensitive medium.

Although certain preferred embodiments of the present invention have been shown and described in detail, it should be understood that various changes and modifications may be made therein without departing from the scope of the appended claims.

What is claimed is:

1. A head device for a printer, comprising:

a light source comprising a plurality of light-emitting diodes;

a plurality of optical fibers associated respectively with said light-emitting diodes, for guiding light emitted from said light-emitting diodes to respective exit ends thereof, each of said optical fibers having a same curvature and length; and an optical system for focusing light emitted from the exit ends of said optical fibers onto a photosensitive medium.

2. A head device according to claim 1, further comprising a plurality of holders, said light-emitting diodes being integrally coupled to respective entrance ends of said optical fibers by said holders.

3. A head device according to claim 1, further comprising a mount member, said light-emitting diodes and said optical fibers being mounted on said mount member and angularly positioned within said mount member relatively to directions of three axes of an orthogonal coordinate system.

4. A head device according to claim 2, further comprising a mount member, said light-emitting diodes and said optical fibers being mounted on said mount member using said holders and angularly positioned within said mount member relatively to directions of three axes of an orthogonal coordinate system.

5. A head device according to claim 4, further comprising a plurality of rubber bushings, said holders being resiliently mounted on said mount member by said rubber bushings.

6. A head device according to claim 4, further comprising a plurality of setscrews having different axes, respectively, and held against said holders, respectively, thereby holding said holders on said mount member.

7. A head device according to claim 1, wherein said optical fibers include at least two sets of optical fibers, each of said optical fibers having a same curvature and length, further comprising:

a plurality of holders, said light-emitting diodes being integrally coupled to respective entrance ends of said optical fibers by said holders; and a pair of mount members;

wherein said holders are mounted on said pair of mount members and angularly positioned within said mount member relatively to directions of three axes of an orthogonal coordinate system.

* * * * *